April 21, 1942.  J. A. CLARKE, JR  2,280,377
DISCONNECTING AND REVERSE MECHANISM
Filed June 17, 1940
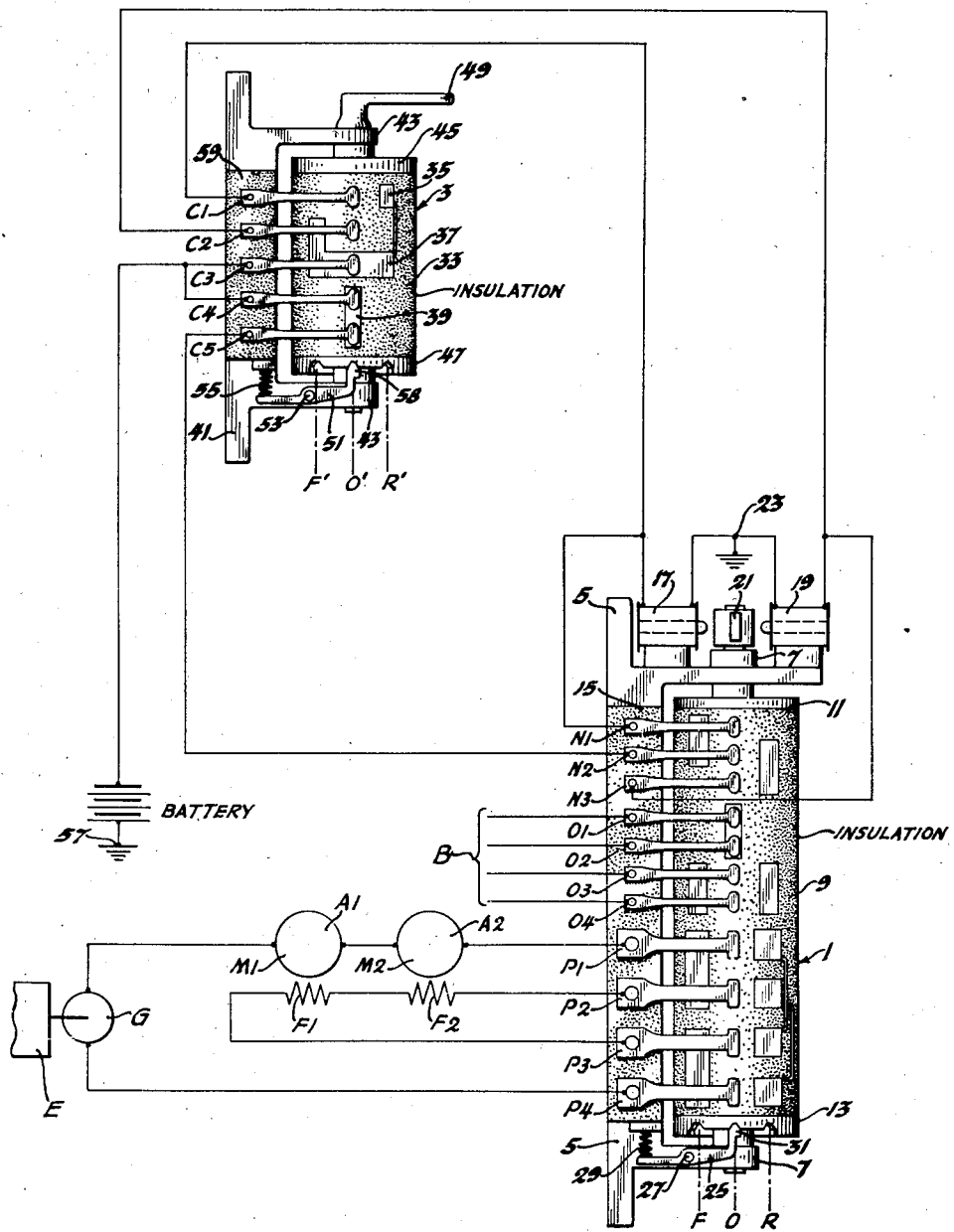

Patented Apr. 21, 1942

2,280,377

UNITED STATES PATENT OFFICE 2,280,377

DISCONNECTING AND REVERSE MECHANISM

John A. Clarke, Jr., La Grange, Ill., assignor to General Motors Corporation, Detroit, Mich., a corporation of Delaware Application June 17, 1940, Serial No. 340,887

5 Claims. (Cl. 175—375)

This invention relates to improvements in remotely controlled power actuated disconnecting and reversing switch mechanisms for electric motors.

Conventional mechanisms of the above type comprise a master controller movable to a forward, neutral and reverse position for controlling energization of power means to cause movement of a reversing switch thereby to a forward or reverse position, and springs are provided to oppose movement of the reversing switch to these positions so that upon deenergization of the power means by movement of the master controller to a neutral position the switch will be returned by the springs to a neutral or off position. It will be evident that with such an arrangement the power means must exert sufficient force to overcome the force of the springs and also the friction of the switch to cause movement of the switch to the forward or reverse positions.

The principal object of the present invention is to provide means by which the reversing switch may be moved to a forward or reverse position and also to a neutral or off position by power means of small size, requiring little energy and exerting little effort.

The means by which the above object is accomplished will be better understood by referring to the following detailed description of my improved disconnecting and reversing switch mechanism and the single drawing accompanying the description.

The drawing shows in diagrammatic form the disconnecting and reversing switch, the improved control and positioning means therefor and the motors and other apparatus controlled by the switch.

Referring to the drawing, a disconnecting and reversing switch is shown at 1 which is movable to a forward, neutral, off or reverse position by power means to connect or disconnect motors shown at $M_1$ and $M_2$ to or from a source of power such as a generator G, which is driven by a prime mover E. The prime mover, generator and motors constitute a driving system which is particularly adaptable for driving vehicles such as locomotives in either direction. Auxiliary connections shown at B connected to the switch 1 are made and broken depending upon the position to which the switch 1 is moved by power means, to be described, the energization of which is controlled by a master controller shown at 3, which is manually movable to a forward, neutral or reverse position, and control means included in the switch 1, also to be described.

The disconnecting and reversing switch 1 comprises a frame 5 having bearing portions 7 for rotatably supporting a rotatable member or drum 9. The drum 9, of insulating material, has end flanges 11 and 13 fixed thereto which have reduced diameter end portions extending through the bearing portions 7 in the frame. A plurality of arcuate contacts are shown on the drum which may be embedded therein or otherwise fixed thereto. These contacts are arranged in three parallel rows on the dotted lines indicated at F, O and R, extending axially along the periphery of the drum. A plurality of spring contact fingers $N_1$ to $N_3$, $O_1$ to $O_4$ and $P_1$ to $P_4$, inclusive, are shown, are being fixed at one end to an insulating member 15 attached to the frame 5 and having their other or free ends axially spaced along and in contact with the periphery of the drum 9. The free ends of all of these fingers are shown in alignment with the dotted line O.

With the drum and contacts in the neutral position as shown, only the free ends of the fingers $O_1$ and $O_2$ are bridged by the arcuate contact on line O but when the drum is moved to the right of the position shown, which is the forward position, the contacts on line F are moved into bridging relation with the free ends of some of the fingers and when moved to the left of the neutral position, which is the reverse position, the contacts on the line R are likewise moved into bridging contact with the free ends of some of the fingers.

The power means for moving the drum away from and back to the neutral position in which it is shown comprises two electromagnets 17 and 19 fixed on the frame 5 at points spaced angularly and radially with respect to the axis of the drum. A lever or armature 21, fixed to the reduced diameter portion of the drum end flange 11, is attracted and moved toward the electromagnet 17 upon energization thereof, which causes the drum 9 to be moved to the left or reverse position. Conversely when the electromagnet 19 is energized the lever 21 and drum 9 are moved to the right or forward position. The electromagnets 17 and 19 are energized through separate connections with the switch 1 and master controller 3 which is also interconnected to the switch 1, as will be described. One terminal of each of the electromagnets 17 and 19 is grounded at 23, the ungrounded terminal of the electromagnet 17 being connected to the finger $N_1$ of the switch 1 and also to the master controller 3, and the ungrounded terminal of the electromagnet 19 being connected to the finger $N_3$ of the switch 1 and likewise connected to the master controller. The finger $N_2$ of the switch 1 is also connected to the master controller. These connections with the master controller will be referred to later.

Positioning means are provided to maintain the drum in the forward, neutral or reverse position. This means comprises the three radial slots shown in the end face of the drum end flange 13 and a lever 25 pivoted to the frame 5 at 27 and having a compression spring 29 between one end thereof and the frame to urge the other or detent end 31 of this lever into either of the slots when either slot is moved in alignment with the end 31. The detent end 31 of this lever is located in alignment with the dotted line O. By this means the drum is held in either the forward, neutral or reverse position with either row of the arcuate contacts on dotted lines F, O and R in bridging relation with certain of the contact fingers.

The fingers $P_1$ to $P_4$ and the arcuate contacts on the drum 9 in alignment therewith serve to connect the motors $M_1$ and $M_2$ in either forward or reverse driving relation with the generator when the drum 9 is in the forward or reverse position and to disconnect the motors from the generator when the drum is in the neutral position as shown. The generator G and the armatures $A_1$ and $A_2$ of the motors $M_1$ and $M_2$ are connected in series across the fingers $P_1$ and $P_4$ and the field windings $F_1$ and $F_2$ of the motors are connected in series across the fingers $P_2$ and $P_3$ so that when the drum is in the neutral position, both the armature and field circuits will be opened and the motors will be disconnected from the generator as the free ends of the fingers $P_1$ to $P_4$, inclusive, are then on an insulated portion of the drum. When the fingers $P_1$ and $P_2$ and $P_2$ and $P_3$ are bridged by the arcuate contacts shown on the dotted line F the field windings will be connected to the armatures and the motors will therefore be connected to the generator to give forward direction of drive and when the contacts on the dotted line R, which are shown cross connected, are moved into bridging relation with the same fingers the field windings will be reversed with respect to the armatures and the motors will therefore be connected to the generator to give reverse drive in a well known manner.

The free ends of the fingers $O_1$ and $O_2$ are shown bridged by the arcuate contact on line O when the drum 9 is in the neutral position. The connections to the fingers $O_1$ and $O_2$ may be connected to any well known type of relay mechanism, not shown, which may be energized only through these fingers and this arcuate contact to cause the generator to be connected across the battery and act as a starting motor for the prime mover E only when the switch 1 is in the neutral position with the motors $M_1$ and $M_2$ disconnected from the generator. The free ends of the fingers $O_3$ and $O_4$ are shown on an insulated portion of the drum 9 when the drum is in the neutral position but are bridged by the arcuate contacts on lines F and R when the drum is moved to either the forward or reverse position. The connections to the fingers $O_3$ and $O_4$ may be connected to auxiliary apparatus such as a motor driven blower, not shown, which may be energized only through these fingers and arcuate contacts when the motors $M_1$ and $M_2$ are connected to the generator G to supply cooling air to the motors. The fingers $O_1$ to $O_4$ and the arcuate contacts movable into contact therewith may thus serve to control auxiliary apparatus for the driving means, which includes the prime mover E, generator G, and motors $M_1$ and $M_2$.

The master switch 3 is constructed in a similar manner to the switch 1 but is smaller in size and manually operated. This switch has an insulated drum 33 provided with three arcuate contacts 35, 37 and 39 embedded therein or otherwise secured to the drum. The contacts 35 and 37 are shown connected together, the former being located on the dotted line R' extending axially along the drum periphery, and the latter being of L shape having a portion extending circumferentially between the dotted lines F'' O' and R', and having a portion extending axially along the dotted line F''. The other contact 39 extends along the line O'. The drum 33 is rotatably supported in a frame 41 having bearing portions 43 through which reduced diameter end portions of two drum end flanges 45 and 47, which are fixed to the drum, are rotatably carried. An operating handle 49 is attached to the reduced diameter end portion of the drum end flange 45 and is manually operable to cause movement of the drum to a forward, neutral or reverse position. The lower drum end flange 47 has three radial slots in the end face thereof, each of which is located, respectively, in alignment with the dotted lines F'', O', and R', and a lever 51 is pivoted at 53 to the frame 41 having a compression spring 55 between one end of the lever and the frame, to cause the other or detent end 58 of this lever to enter either of the slots to position the drum in any one of three positions, namely, forward, neutral or reverse. A plurality of spring contact fingers $C_1$ to $C_5$ are each fixed at one end to an insulating member 59 attached to the frame 41, and have their other or free ends axially spaced along and in contact with the drum 33. The free ends of these fingers are positioned in alignment with the dotted line O'. With the drum in the neutral position as shown, the free ends of the fingers $C_1$ and $C_2$ are on an insulated portion of the drum, the free end of the finger $C_3$ is in contact with the circumferential portion of the contact 37 at its mid-point, and the free ends of the fingers $C_4$ and $C_5$ are bridged by the arcuate contact 39. Movement of the drum 33 to the left or reverse position causes the fingers $C_1$ and $C_3$ to be bridged by the contacts 35 and 37, which are connected together as shown, and causes the contact 39 to move to the left out of bridging relation with the fingers $C_4$ and $C_5$. Movement of the drum to the right from the neutral position to the forward position causes the fingers $C_2$ and $C_3$ to be bridged by the axially extending portion of the L shaped contact 37 and causes the contact 39 to move to the right out of bridging relation with the fingers $C_4$ and $C_5$.

The fingers $C_1$ and $C_2$ are connected, respectively, to the ungrounded terminals of the electromagnets 17 and 19, the fingers $C_3$ and $C_4$ are connected to one terminal of the battery, the other terminal of which is grounded at 57, and the finger $C_5$ is connected to the finger $N_2$ of the switch 1.

*Operation*

With the master controller 3 and the disconnecting and reversing switch 1 in their neutral positions as shown, movement of the master controller drum 33 to the right or forward position connects the electromagnet 19 to the battery through the connections with the fingers $C_2$ and $C_1$, which are then bridged by the axially extending portion of the L shaped contact 37, and the drum 9 of the switch 1 is accordingly moved by the electromagnet 19 to the right or forward position. Movement of the drum 9 to this position causes the fingers $N_1$ and $N_2$ to be bridged, thus establishing a connection from the electromagnet 17 to the finger $C_5$ of the master controller, as the electromagnet 17 is permanently connected to the finger $N_1$ and the finger $N_2$ is permanently connected to the finger $C_5$. When the master controller is moved back to the neutral position energization of the electromagnet 19 ceases when the arcuate contact 37 moves out of bridging relation with the fingers $C_2$ and $C_3$, and the electromagnet 17 is energized through the circuit connection established through the fingers $N_1$ and $N_2$ bridged by the arcuate contact on the drum 9 and the fingers $C_5$ and $C_4$ which are bridged by the arcuate contact 39 of the master controller when the drum 33 is moved to the neutral position. Energization of the electromagnet 17 causes the drum 9 of the switch 1 to move to the left which causes deenergization of the electromagnet before the drum reaches the neutral position by movement of the arcuate contact out of bridging relation with the fingers $N_1$ and $N_2$. The force exerted by the electromagnet 17 during the time the fingers $N_1$ and $N_2$ are bridged is sufficient to cause return movement of the drum 9 to the neutral position, the inertia of the drum being such that the detent end 31 of the lever 25 will enter the radial slot and prevent movement of the drum beyond the neutral position in which the drum is shown. The arcuate or circumferential length of the contact movable into and out of bridging relation with the fingers $N_1$ and $N_2$ is such, therefore, that the duration of time that the electromagnet 17 is energized causes movement of the drum 9 to the neutral position which causes it to follow movement of the drum 33, that is, back to the neutral position.

Conversely, movement of the master controller drum 33 to the left or reverse position causes the electromagnet 17 to be energized through the fingers $C_1$ and $C_3$ which are bridged by the interconnected arcuate contacts 35 and 37 to cause movement of the drum 9 of the switch 1 to the left or reverse position. With the drum 9 in the reverse position the fingers $N_2$ and $N_3$ are bridged, establishing a connection from the electromagnet 19 to the finger $C_5$ of the master controller. When the master controller drum 33 is then moved to the neutral position the electromagnet 19 is energized through the connection established through fingers $N_2$ and $N_3$ and fingers $C_5$ and $C_4$ which are bridged by the contact 39. The arcuate or circumferential length of the contact in bridging relation with the fingers $N_2$ and $N_3$ is such that the electromagnet 19 is energized for sufficient time through this contact to cause movement of the drum 9 back to the neutral position where it is held by the detent end 31 of the lever 25 as before.

With the above energization control of the power means the movement of the disconnecting and reversing switch drum 9 follows the movement of the master control drum to corresponding positions. The power means are of small size and require little energy, and the disconnecting and reversing switch, in addition to causing the connection of the motors $M_1$ and $M_2$ in forward or reverse driving relation with the generator, completes an auxiliary circuit through the fingers $O_2$ and $O_3$ when in either of these positions and disconnects the motors from the generator to allow it to act as a starting motor for the prime mover E when the controller is in the neutral position by the connection set up by the bridging of the fingers $O_1$ and $O_2$. The auxiliary circuits B to the switch 1 are thus interlocked with the motor and generator circuits.

It will be evident that electropneumatic power means may be used to cause movement of the switch in a similar manner. With power means of this well known type operably connected to the drum 9 of the disconnecting switch in any well known manner, the electromagnets for operating the valves of the pneumatic means may be connected for energization through similar connections with the master controller and the disconnecting and reversing switch, and the movement of the switch will likewise follow movement of the master controller as described.

I claim:

1. In combination, a power operated control device capable of instantaneous movement to any one of three control positions, said power operated device including power operated means, connection reversing and disconnecting control means for said power operated means, and operable thereby, and means for resisting movement of said device in any one of said control positions, and a manually operable controller connected to said power operated means and said control means therefor, said controller being movable to any one of three control positions to control the application of power to said power operated means when said device is in any one of its three control positions to cause instantaneous follow-up movement thereof to any other of said three positions corresponding to the controller positions.

2. In combination, a multi-position switch having a plurality of contact making positions and a single contact breaking position, a plurality of magnetic means for attracting and instantaneously moving said switch in either direction, means for resisting movement of said switch in any one of said positions and a manually operable multiple position master switch electrically connected to both said first named switch and the electromagnetic attracting means therefor in such manner that movement of said master switch in either direction to contact making positions at either side of a given contact making position serves to control energization of only one of said plurality of electromagnetic means to cause substantially instantaneous movement of said first named switch to a position corresponding to that of the master switch, whereupon said first named switch then serves only to establish or set up a connection with said master switch and one of said other electromagnetic means for subsequent energization thereof only upon reverse movement of said master switch back to said given contact making position, thereby causing substantially instantaneous reverse movement of said first named switch toward the contact breaking position in which it is retained by the means resisting movement thereof in this position.

3. In combination, an electromagnetically actuated three position reversing and disconnecting switch suitable for controlling vehicle traction motors, said switch including means for resisting movement thereof in all of said positions, a pair of electromagnets adapted to be separately energized to cause movement of said switch in either direction to contact making positions at either side of a neutral or contact breaking position and back to said contact breaking position, each of said electromagnets being separately connected to said switch in such manner that a connection is set up or established between one electromagnet and said switch by movement of said switch to one contact making position upon energization of said other electromagnet, a source of electrical energy and a manually operable master control switch movable to any one of three contact making positions and electrically connected between said source of energy and to each of said electromagnets and also to said switch actuated by said electromagnets for solely controlling energization of either of said electromagnets either directly to cause movement of said electromagnetically actuated switch to either of said contact making positions and to control energization of either of said electromagnets indirectly through the connection established by the electromagnetically actuated switch when in a contact making position to cause movement thereof back to the contact breaking position.

4. In combination, a manually operable master control switch movable in two directions to neutral, forward or reverse contact making positions, a remotely controlled reversing and disconnecting switch capable of moving in two directions, means for resisting movement thereof in three positions, said three positions comprising an open or neutral position, a forward closed position, and a reverse closed position, conductors interconnecting said switches, a pair of electromagnets each individually connected to both said switches in such manner that one only of said electromagnets can be energized when said master control switch is moved from the neutral position to another contact making position, the energization of one of said electromagnets causing the movement of said remotely controlled switch to a forward or a reverse position, the movement of said remotely controlled switch by said energized magnet causing a connection to be established or set up with the other or non-energized magnet, said non-energized magnet being subsequently energized only by the return movement of the master control switch to the neutral position, the energization of said non-energized magnet causing the return movement of said remotely controlled switch to the neutral or off position, said controlled switch being retained in its neutral position by the movement resisting means.

5. In combination, a manually operable master control switch movable in two directions to neutral, forward or reverse contact making positions, a remotely controlled reversing and disconnecting switch suitable for use in controlling traction motors driving a vehicle, said switch being movable in two directions and having means for resisting movement thereof in three positions, one of said positions being a neutral or open position and the other two positions being forward and reverse positions, circuit establishing means having separate connections with each electromagnet and operable by said controlled switch in moving to said forward or reverse positions, conductors connecting said master control switch with said circuit establishing means, a pair of interconnected electromagnets each individually connected to both said switches in such manner that one only of said electromagnets may be energized when said master control switch is moved from the neutral position, the energization of one of said electromagnets causing the movement of said remotely controlled switch to a forward or a reverse position, the movement of said remotely controlled switch by said energized magnet causing a connection to be established or set up by said circuit establishing means to the other or non-energized magnet, said non-energized magnet being subsequently energized only by the return movement of the master control switch to the neutral position, the energization of said non-energized magnet causing return movement of said controlled switch to the neutral or open position, which renders said circuit establishing means inoperative, said controlled switch being retained in its neutral or open position by the movement resisting means.

JOHN A. CLARKE, Jr.